(12) United States Patent
Liles et al.

(10) Patent No.: US 11,608,748 B2
(45) Date of Patent: Mar. 21, 2023

(54) PREFORM CROSSOVERS FOR COMPOSITE AIRFOILS

(71) Applicant: Raytheon Technologies Corporation, Farmington, CT (US)

(72) Inventors: Howard J. Liles, Newington, CT (US); Tyler G. Vincent, Portland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 25 days.

(21) Appl. No.: 17/339,198

(22) Filed: Jun. 4, 2021

(65) Prior Publication Data

US 2022/0389822 A1    Dec. 8, 2022

(51) Int. Cl.
*F01D 5/28* (2006.01)
*F01D 5/18* (2006.01)
*B28B 1/42* (2006.01)

(52) U.S. Cl.
CPC ............. *F01D 5/282* (2013.01); *B28B 1/42* (2013.01); *F01D 5/18* (2013.01); *F01D 5/187* (2013.01); *F05D 2230/314* (2013.01); *F05D 2240/303* (2013.01); *F05D 2250/231* (2013.01); *F05D 2250/232* (2013.01); *F05D 2260/232* (2013.01); *F05D 2300/2261* (2013.01); *F05D 2300/6033* (2013.01)

(58) Field of Classification Search
CPC . F01D 5/282; F01D 5/18; F01D 5/186; F01D 5/187
See application file for complete search history.

(56) References Cited

U.S. PATENT DOCUMENTS

| 5,383,566 A * | 1/1995 | Johnson ................. B60T 17/06 220/586 |
| 6,884,030 B2 * | 4/2005 | Darkins, Jr. ............ F01D 9/042 29/889.22 |
| 10,207,471 B2 * | 2/2019 | de Diego ................ F01D 5/147 |
| 10,260,358 B2 | 4/2019 | Kittleson et al. |

(Continued)

FOREIGN PATENT DOCUMENTS

| EP | 2787174 A2 | 10/2014 |
| EP | 3508316 A2 | 7/2019 |

OTHER PUBLICATIONS

Extended European Search Report for EP Application No. 22169258. 5, dated Oct. 24, 2022, 8 pages.

*Primary Examiner* — Topaz L. Elliott

(74) *Attorney, Agent, or Firm* — Kinney & Lange, P.A.

(57) ABSTRACT

A method of forming a ceramic matrix composite component having an internal cooling circuit includes wrapping at least a first sheet around a first mandrel, wrapping at least a second sheet around a second mandrel, creating a first plurality of holes in the first sheet corresponding to a plurality of openings in the first mandrel, creating a second plurality of holes in the second sheet corresponding to a plurality of openings in the second mandrel, aligning the first mandrel and the second mandrel such that the first plurality of holes face and are aligned with the second plurality of holes, wrapping at least a third sheet around both the first mandrel and second mandrel to form a preform, the preform comprising each of the first sheet, the second sheet, and the third sheet, and densifying the preform. The first sheet, second sheet, and third sheet are formed from a ceramic fiber material.

12 Claims, 5 Drawing Sheets

(56) References Cited

U.S. PATENT DOCUMENTS

| | | | |
|---|---|---|---|
| 10,408,084 B2* | 9/2019 | Thomas | F01D 9/065 |
| 10,458,251 B2* | 10/2019 | Gallier | F01D 5/187 |
| 10,465,533 B2 | 11/2019 | Morgan et al. | |
| 10,724,387 B2* | 7/2020 | Farrar | B29D 99/0025 |
| 10,774,005 B2* | 9/2020 | Propheter-Hinckley | B32B 5/02 |
| 10,934,854 B2 | 3/2021 | Weaver et al. | |
| 11,180,999 B2* | 11/2021 | Decesare | B32B 18/00 |
| 11,286,792 B2* | 3/2022 | Razzell | C04B 35/16 |
| 11,352,887 B2* | 6/2022 | Gallier | F01D 5/282 |
| 2004/0120811 A1* | 6/2004 | Darkins, Jr. | F01D 9/042 415/191 |
| 2008/0124512 A1* | 5/2008 | Steibel | F01D 5/282 428/105 |
| 2010/0254824 A1* | 10/2010 | Naik | F01D 5/186 416/97 R |
| 2016/0258320 A1* | 9/2016 | Thomas | F01D 25/005 |
| 2017/0320232 A1* | 11/2017 | de Diego | B32B 7/04 |
| 2017/0342842 A1* | 11/2017 | Gallier | F01D 5/282 |
| 2018/0283441 A1* | 10/2018 | Pollitt | B29C 70/32 |
| 2019/0055845 A1* | 2/2019 | Quach | F01D 5/186 |
| 2019/0210929 A1* | 7/2019 | Propheter-Hinckley | F01D 5/18 |
| 2020/0102837 A1* | 4/2020 | Gallier | B23P 15/04 |
| 2020/0149423 A1* | 5/2020 | Farrar | F01D 5/282 |
| 2020/0291805 A1* | 9/2020 | Clark | F01D 11/08 |
| 2020/0346983 A1 | 11/2020 | Read et al. | |
| 2021/0032995 A1* | 2/2021 | Razzell | C04B 35/573 |
| 2021/0189889 A1* | 6/2021 | Decesare | F01D 5/187 |

* cited by examiner

PREFORM CROSSOVERS FOR COMPOSITE AIRFOILS

BACKGROUND

The present invention relates to the fabrication of composite components, and more particularly, to a ceramic matrix composite having improved properties for operating in gas turbine engines.

Ceramic matrix composite components, such as those formed of silicon carbide, are commonly used in high-temperature environments because they can withstand temperatures up to 2500° F. Such components can still benefit from additional cooling to prevent component degradation. One way to provide additional cooling is through the incorporation of internal cooling channels into the component. The structure of many composite components can make adding such features somewhat difficult when using traditional fabrication processes.

SUMMARY

A method of forming a ceramic matrix composite component having an internal cooling circuit includes wrapping at least a first sheet around a first mandrel, wrapping at least a second sheet around a second mandrel, creating a first plurality of holes in the first sheet corresponding to a plurality of openings in the first mandrel, creating a second plurality of holes in the second sheet corresponding to a plurality of openings in the second mandrel, aligning the first mandrel and the second mandrel such that the first plurality of holes face and are aligned with the second plurality of holes, wrapping at least a third sheet around both the first mandrel and second mandrel to form a preform, the preform comprising each of the first sheet, the second sheet, and the third sheet, and densifying the preform. The first sheet, second sheet, and third sheet are formed from a ceramic fiber material.

A ceramic matrix composite airfoil can include an outer wall, a dividing wall extending between the outer wall, at least a first cavity and a second cavity defined by the outer wall and the dividing wall, the first and second cavities extending between an inner diameter of the airfoil and an outer diameter of the airfoil, and a plurality of crossover channels disposed within the dividing wall and fluidly connecting the first and second cavities. The dividing wall includes a first sheet of ceramic fiber material surrounding the first cavity, and a second sheet of ceramic fiber material surrounding the second cavity, and the outer wall includes the first sheet of ceramic fiber material, the second sheet of ceramic fiber material, and a third sheet of ceramic fiber material surrounding the first and second sheets of ceramic fiber material.

Figure 1:
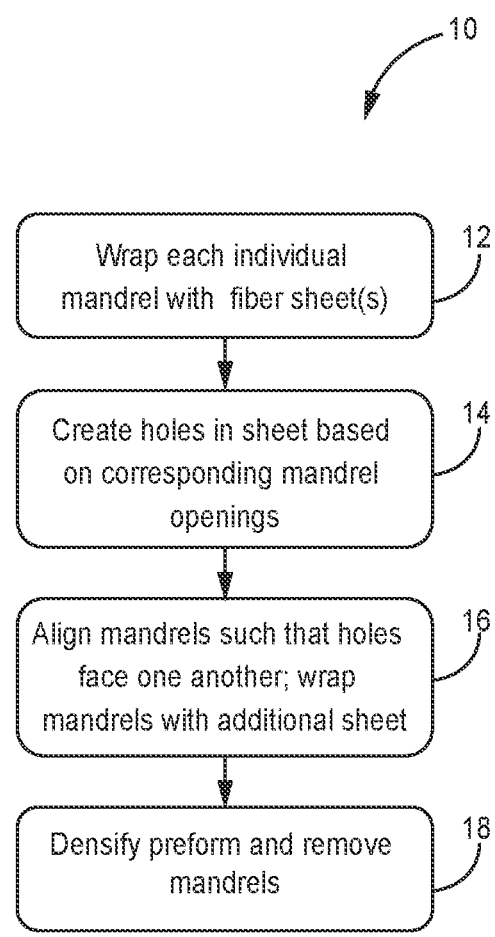
FIG. 1 is a flow chart illustrating steps of a method of forming an internally cooled composite component.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents a composite component with internal, fluidly-connected cavities, and a method of forming that composite component. The method includes wrapping multiple mandrels each with at least one fiber sheet. Each mandrel has openings or cut-outs that can serve as a template for creating corresponding holes in these fiber sheets. Holes can be formed by removal of material (e.g., cutting or punching an opening in the sheet) or by pushing a pin through the thickness of the sheet and into the mandrel opening. Two wrapped mandrels can be placed together and aligned such that the holes in each sheet face and are aligned with one another. The mandrels are then overwrapped with at least one further sheet securing the wrapped mandrels in place. The resulting preform structure can undergo matrix formation and mandrel removal to become a composite component with elongate cavities fluidly connected at least in part by passages formed by the aligned holes within the fiber sheets.

Figure 2:
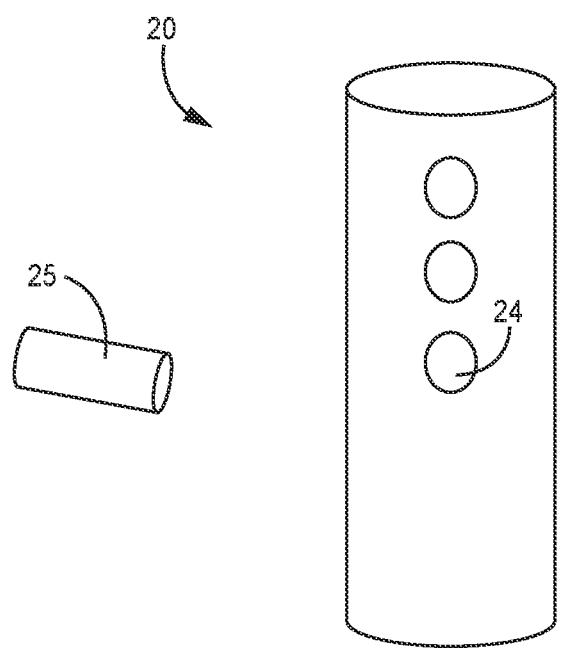
FIG. 2 is a simplified perspective view of a mandrel used to form the composite component.

FIG. 1 is a flowchart illustrating selected steps 12-18 of method 10, used to form a composite component. In an exemplary embodiment, the component is a ceramic matrix composite (CMC) component. FIG. 2 is a simplified illustration of mandrel 20 used in method 10. FIGS. 3, 4, 5, and 6 are simplified cross-sectional views of alternate embodiments of a fiber preform. Steps 12-18 are described below in combination with FIGS. 2-6.

Figure 3:
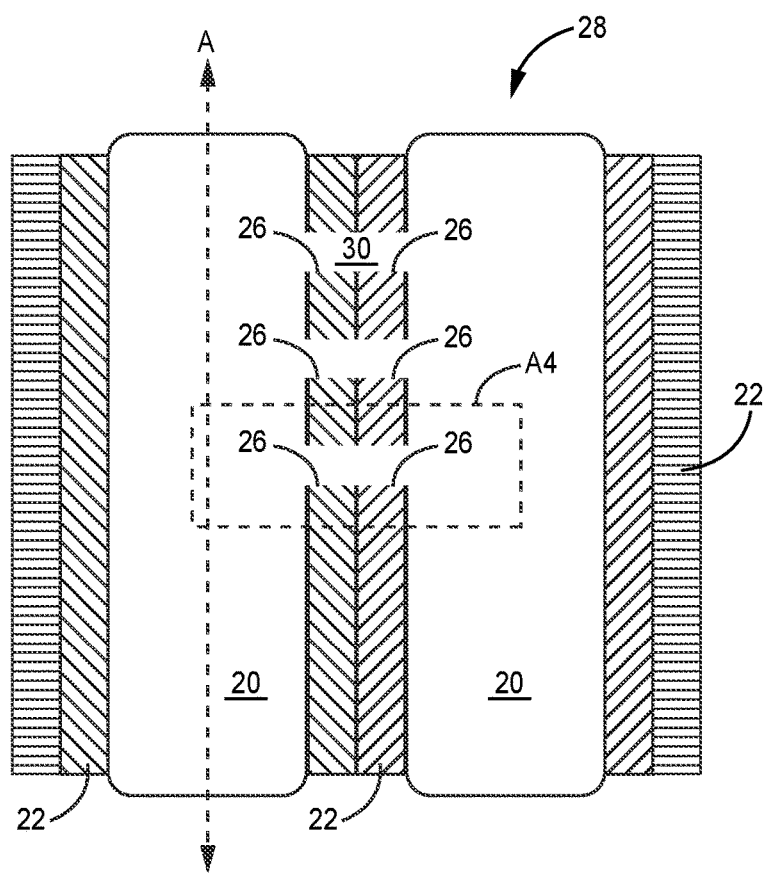
FIG. 3 is a simplified cross-sectional view of a composite preform structure with channels, indicating area A4.
Figure 5:
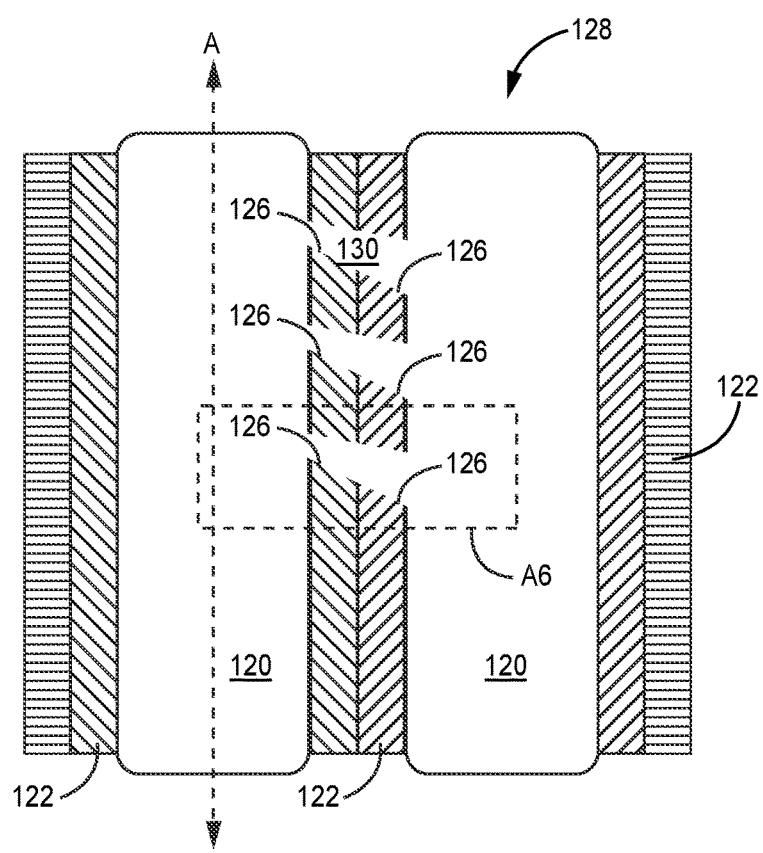
FIG. 5 is a simplified cross-sectional view of an alternative composite preform structure with channels, indicating area A6.

At step 12, each mandrel 20 is wrapped with at least one composite fiber sheet 22 (shown in FIGS. 3 and 5). As used herein, the term "sheet" can be interchangeable with terms such as "ply" and "fabric". Each sheet 22 (or 122 in FIG. 5) can be formed from braided or woven ceramic fibers or tows arranged in a uni- or multidirectional manner. Exemplary sheets 22, 122 can have 5-harness, 8-harness, plain, or twill weave patterns. The ceramic fibers can be formed from silicon carbide or other suitable ceramic materials. Each sheet 22, 122 can have a thickness ranging from 0.006 inches to 0.020 inches (0.152 mm to 0.508 mm).

As shown in FIG. 2, each mandrel 20 can include one or more openings 24. Openings 24 can be rounded (e.g., circular, elliptical, etc.), have straight sides (e.g., diamond, square, etc.) or a combination of the two. Openings 24 can further be generally uniform in size and shape, as shown in FIG. 2, or can vary along a given mandrel 20. Most generally, openings 24 are formed at locations and in shapes selected to promote a desired fluid flow volume and patterns between open or hollow spaces in the final component defined during manufacture by the respective locations of adjacent mandrels. A sheet 22 can be wrapped around a respective mandrel 20 such that it at least fully circumscribes the mandrel (i.e., opposite ends of sheet 22 touch or overlap slightly). In an alternative embodiment, however, it may only be necessary to cover an area including openings 24, but otherwise not fully circumscribe the mandrel 20 with the one or more sheets 22.

At step 14, and once sheet 22 is wrapped around or otherwise secured to mandrel 20, sections of sheet 22 corresponding to the underlying openings 24 of mandrel 20 are manipulated to form holes 26. In one embodiment, holes 26 can be formed by completely removing sections (i.e., portions lesser than the whole) of sheet 22 by, for example, cutting through the fibers of sheet 22 with a sharp tool or laser, or by using a punching tool. Each hole 26 can generally be formed to match the geometry of the underlying mandrel opening 24.

In an alternative embodiment, holes 26 can be formed by pushing pin 25 (shown in FIG. 2) through a section of sheet 22 corresponding to an opening 24 in mandrel 20. As used herein, the term "pin" can be interchangeable with terms such as "needle," "rod," "tube," or "wire." Pin 25 can be inserted into sheet 22 such that it generally does not damage (e.g., puncture or break) individual fibers, rather, fibers are pushed aside to accommodate the pin. This differs from cutting or punching through sheet 22 which breaks fibers so that a section of sheet 22 is separated and removed. Using a pin may be preferable if greater continuity (e.g., lack of breakage) of fibers within individual sheets 22 is desired for enhanced mechanical and/or thermal properties. One or more pins 25 can be used to create holes 26. In some cases, pin(s) 25 can create a hole 26 but be removed prior to subsequent processing. In other cases, however, individual pins 25 can be pushed into sheet 22 at the desired location of holes 26 and remain embedded throughout subsequent steps of method 10. The latter may prevent the fibers from moving back into the region of holes 26 during, for example, matrix formation discussed below. In another alternative embodiment, one or more pins 25 can be formed as a part of mandrel 20 (as protrusions, bumps, bosses, etc.) in a manner similar to the arrangement of openings 24. In such an embodiment, a sheet 22 can be pushed down onto the protrusions and wrapped as desired.

Figure 6:
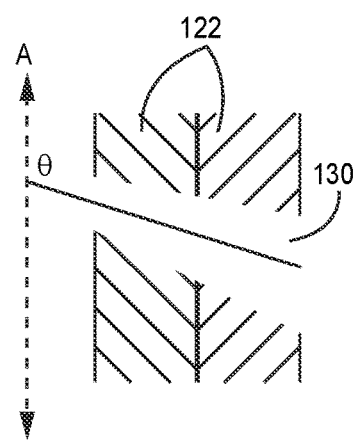
FIG. 6 is a close-up cross-sectional view of area A6 of FIG. 5.

At step 16, and once the desired holes 26 are formed in each sheet 22 of each mandrel 20, mandrels 20 are brought together and aligned such that the holes 26 of the first sheet 22 on the first mandrel 20 are aligned with holes 26 on the second sheet 22 of the second mandrel 20. This alignment can, as in the embodiment illustrated in FIGS. 3 and 4, be achieved when openings 24 of adjacent mandrels are aligned. In other embodiments, as illustrated in FIGS. 5 and 6, the shaping or angle of holes 26 can result in alignment of holes 26 requiring that openings 24 of adjacent mandrels be relatively displaced or offset. Once aligned, mandrels 20 can be overwrapped by at least one additional sheet 22 which surrounds both mandrels 20 to form fiber preform 28.

FIG. 3 is a cross-sectional view of preform 28 including a first mandrel 20 wrapped with a first sheet 22, a second mandrel 20 wrapped with a second sheet 22, and overwrapped with a third sheet 22. Preform 28 extends along longitudinal axis A. It should be understood that either/both mandrels 20 can be wrapped with more than one sheet 22, and the overwrap can additionally/alternatively include more than one sheet 22 based on, for example, the desired thickness of the corresponding regions of the final component. Further, although represented with varied hatching for easier visualization of the individual sheets 22, sheets 22 can be formed from the same material and/or have the same thickness, or vary in material and/or thickness. As can be seen in FIG. 3, a pair of aligned holes 26 form a channel 30.

Figure 4:
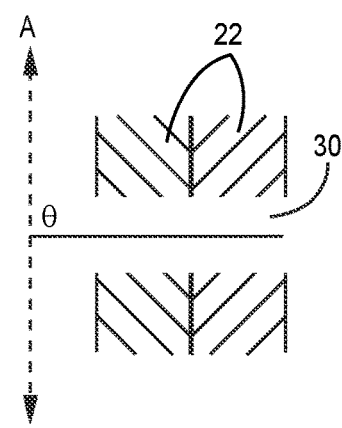
FIG. 4 is a close-up cross-sectional view of area A4 of FIG. 3.

FIG. 4 is an enlarged view of area A4 of FIG. 3 showing an individual channel 30. With reference to FIGS. 3 and 4, holes 26 are aligned such that channel 30 is generally orthogonal (i.e., angle $\Theta=90°$) to axis A. Such channel orientation can be achieved by forming pairs of holes 26 at the same location on the respective mandrels 20. Additionally, channels 30 can have a generally cylindrical cross-sectional shape when each hole 26 in a respective pair has the same area as the corresponding hole 26. Other cross-sectional shapes (e.g., frustoconical) are contemplated herein.

FIG. 5 is a cross-sectional view of alternative preform 128. FIG. 6 is an enlarged view of area A6 of FIG. 5 showing an individual channel 130 of preform 128. Preform 128 is substantially similar to preform 28, except for the shape and orientation of channels 130. As shown, channels 130 extend at a non-orthogonal angle with respect to axis A. More specifically, angle $\Theta$ is greater than 90°, and can alternatively be less than 90° in another embodiment. Angled channels 130 can be achieved by staggering/offsetting each hole 126 in a respective pair of holes 126. Channels 130 are also shown as having a frustoconical cross-sectional shape, which can be achieved by making one hole 126 in a respective pair of holes 126 larger in at least one dimension than the corresponding hole 126. Other cross-sectional shapes (e.g., cylindrical) are contemplated herein. Angled and/or frustoconical channels can promote directional flow (e.g., for vortex formation) to improve cooling.

The size of each hole 26 and/or 126 can range from 0.010 inches to 0.200 inches (0.254 mm to 5.08 mm). As used herein, size can refer to a major dimension, such as radius for circular and elliptical holes 26, 126, or length of a straight segment for shapes such as square, rectangular, diamond, etc.

At step 18, preform 28, 128 undergoes matrix formation and densification using a chemical vapor infiltration or deposition (CVI or CVD) process. During densification, sheets 22,122 are infiltrated by reactant vapors, and a gaseous precursor deposits on the fibers. The matrix material can be a silicon carbide or other suitable ceramic material. Densification is carried out until the resulting CMC has reached the desired residual porosity. Mandrels 20, 120 can also be physically or chemically removed post-densification, as well as any pins, if used, inserted in sheets 22, 122. Removing mandrels 20, 120 and pins 25 leaves cavities and passages within the finished workpiece for cooling airflow.

Figure 7:
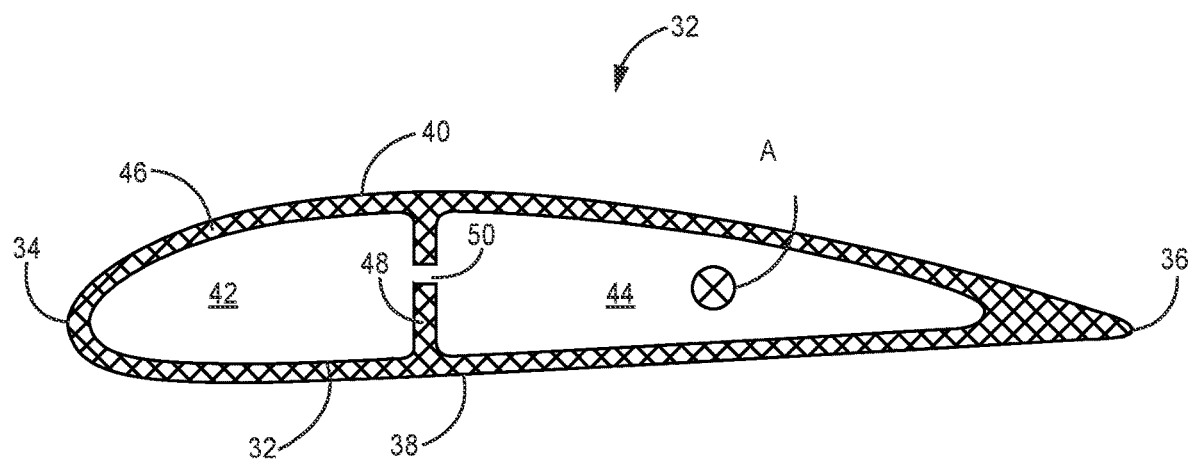
FIG. 7 is a cross-sectional view of a composite airfoil formed using the method of FIG. 1.

FIG. 7 is a cross-sectional view of component 32, a CMC airfoil, formed using method 10. Component 32 extends longitudinally along axis A, which can be the same as the longitudinal axis of preform 28, 128. Component 32 includes leading edge 34, trailing edge 36, pressure side 38, and suction side 40. A leading edge cavity 42 is and trailing edge cavity 44 are defined by outer wall 46 and dividing wall 48. Each of leading edge cavity 42 and trailing edge cavity 44 represent the space at least partially occupied by mandrels 20, 120 during component preforming. Walls 46 and 48 are formed by the various sheets 22, 122 wrapped around mandrels 20, 120. Any of walls 46 and 48 can have a wall thickness ranging from 0.020 inches to 0.060 inches (0.152 mm to 0.508 mm). Crossover channels 50 (only one is shown) in dividing wall 48 are equivalent to channels 30, 130 of preform 28, 128. In operation of component 32, a cooling airflow can be supplied to leading edge cavity 42 and/or trailing edge cavity 44 from an external source, and the cooling airflow can pass from the receiving cavity to the other cavity via crossover channels 50.

Method 10 discussed above can include additional steps (inter-step or post processing) not shown in FIG. 1. For example, after step 18, various post-processing steps can be performed, such as the application of one or more protective coatings, such as environmental and/or thermal barrier coatings. A bond coat can also be applied to facilitate bonding between the CMC and protective coating. Other protective coatings, especially those suitable for use in a gas turbine engine environment, are contemplated herein. Various inter-step processes can also be performed, such as the application of a tackifier to sheets 22, 122 prior to or just after wrapping on mandrels 20. Other inter-step processes like surface preparation and cleaning are contemplated herein.

It should also be understood that alternative preform embodiments can include more than two mandrels to create additional cavities in component 32, as well as any combination of channels 30, 130 in a single embodiment. Channels can also be formed in other walls (e.g., outer wall) and structures in the composite component. It is further possible to apply the disclosed method to other types of composites (e.g., organic matrix composites) without departing from the scope of the present disclosure.

Discussion of Possible Embodiments

The following are non-exclusive descriptions of possible embodiments of the present invention.

A method of forming a ceramic matrix composite component having an internal cooling circuit includes wrapping at least a first sheet around a first mandrel, wrapping at least a second sheet around a second mandrel, creating a first plurality of holes in the first sheet corresponding to a plurality of openings in the first mandrel, creating a second plurality of holes in the second sheet corresponding to a plurality of openings in the second mandrel, aligning the first mandrel and the second mandrel such that the first plurality of holes face and are aligned with the second plurality of holes, wrapping at least a third sheet around both the first mandrel and second mandrel to form a preform, the preform comprising each of the first sheet, the second sheet, and the third sheet, and densifying the preform. The first sheet, second sheet, and third sheet are formed from a ceramic fiber material.

The method of the preceding paragraph can optionally include, additionally and/or alternatively, any one or more of the following features, configurations and/or additional components:

In the above method, the ceramic fiber material can include silicon carbide.

In any of the above methods, densifying the preform can include one of a chemical vapor infiltration or chemical vapor deposition process.

In any of the above methods, the step of creating the first plurality of holes in the first sheet and the second plurality of holes in the second sheet can include removing a plurality of sections of the first sheet using a cutting or punching technique, the plurality of sections corresponding to the plurality of openings in the first mandrel, and removing a plurality of sections of the second sheet using the cutting or punching technique, the plurality of sections corresponding to the plurality of openings in the second mandrel.

In any of the above methods, at least one of the first plurality of holes and at least one of the second plurality of holes can have a dimension ranging from 0.010 inches to 0.200 inches, and the dimension can be a diameter or a length.

In any of the above methods, at least one of the first plurality of holes can be aligned with a corresponding one of the second plurality of holes to form a channel through an internal preform wall orthogonal to a longitudinal axis of the preform.

In any of the above methods, at least one of the first plurality of holes can be offset from a corresponding one of the second plurality of holes to form a channel through an internal preform wall angled away from a longitudinal axis of the preform less than 90° or greater than 90°.

In any of the above methods, the dimension of the at least one of the first plurality of holes can be smaller than the dimension of the dimension of the corresponding one of the second plurality of holes.

In any of the above methods, the step of creating a first plurality of holes in the first sheet and a second plurality of holes in the second sheet can include inserting a pin through a plurality of sections of the first sheet corresponding to the plurality of openings in the first mandrel, and inserting a pin through a plurality of sections of the second sheet corresponding to the plurality of openings in the second mandrel.

In any of the above methods, inserting the pin through the plurality of sections of the first sheet and the second sheet can push fibers of each of the first sheet and the second sheet apart at a location of the pin.

In any of the above methods, at least one of the first plurality of holes and at least one of the second plurality of holes can have a dimension ranging from 0.010 inches to 0.200 inches, and the dimension can be a diameter or a length.

Any of the above methods can further include removing the first mandrel and the second mandrel from the preform.

A ceramic matrix composite airfoil can include an outer wall, a dividing wall extending between the outer wall, at least a first cavity and a second cavity defined by the outer wall and the dividing wall, the first and second cavities extending between an inner diameter of the airfoil and an outer diameter of the airfoil, and a plurality of crossover channels disposed within the dividing wall and fluidly connecting the first and second cavities. The dividing wall includes a first sheet of ceramic fiber material surrounding the first cavity, and a second sheet of ceramic fiber material surrounding the second cavity, and the outer wall includes the first sheet of ceramic fiber material, the second sheet of ceramic fiber material, and a third sheet of ceramic fiber material surrounding the first and second sheets of ceramic fiber material.

The airfoil of the preceding paragraph can optionally include, additionally and/or alternatively, any one or more of the following features, configurations and/or additional components:

In the above airfoil, the ceramic fiber material can include silicon carbide.

In any of the above airfoils, a thickness of one of the outer wall and the dividing wall can range from 0.020 inches to 0.060 inches.

In any of the above airfoils, at least one of the plurality of crossover channels can be oriented orthogonal to a longitudinal axis of the airfoil.

In any of the above airfoils, at least one of the plurality of crossover channels can be angled away from a longitudinal axis of the preform less than 90° or greater than 90°.

In any of the above airfoils, at least one of the plurality of crossover channels can have a dimension ranging from 0.010 inches to 0.200 inches, and the dimension can be a diameter or a length.

In any of the above airfoils, at least one of the plurality of crossover channels can have one of a cylindrical and frustoconical cross-sectional shape.

In any of the above airfoils, one of the at least two cavities can be a leading edge cavity.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of forming a ceramic matrix composite component having an internal cooling circuit, the method comprising:
    wrapping a first sheet around a first mandrel;
    subsequently, creating a first plurality of holes in the first sheet corresponding to a plurality of openings in the first mandrel;
    wrapping a second sheet around a second mandrel;
    subsequently, creating a second plurality of holes in the second sheet corresponding to a plurality of openings in the second mandrel;
    subsequently aligning the first mandrel with the first sheet and the second mandrel with the second sheet such that the first plurality of holes face and are aligned with the second plurality of holes;
    wrapping a third sheet around both the first mandrel and second mandrel to form a preform, the preform comprising each of the first sheet, the second sheet, and the third sheet; and
    densifying the preform;
    wherein the first sheet, second sheet, and third sheet are formed from a ceramic fiber material.

2. The method of claim 1, wherein the ceramic fiber material comprises silicon carbide.

3. The method of claim 1, wherein densifying the preform comprises one of a chemical vapor infiltration or chemical vapor deposition process.

4. The method of claim 3 and further comprising: removing the first mandrel and the second mandrel from the preform.

5. The method of claim 1, wherein the step of creating the first plurality of holes in the first sheet and the second plurality of holes in the second sheet comprises:
    removing a plurality of sections of the first sheet using a cutting or punching technique, the plurality of sections corresponding to the plurality of openings in the first mandrel; and
    removing a plurality of sections of the second sheet using the cutting or punching technique, the plurality of sections corresponding to the plurality of openings in the second mandrel.

6. The method of claim 5, wherein at least one of the first plurality of holes and at least one of the second plurality of holes has a dimension ranging from 0.010 inches to 0.200 inches, and wherein the dimension is a diameter or a length.

7. The method of claim 6, wherein at least one of the first plurality of holes is aligned with a corresponding one of the second plurality of holes to form a channel through an internal preform wall orthogonal to a longitudinal axis of the preform.

8. The method of claim 6, wherein at least one of the first plurality of holes is offset from a corresponding one of the second plurality of holes to form a channel through an internal preform wall angled away from a longitudinal axis of the preform less than 90° or greater than 90°.

9. The method of claim 6, wherein the dimension of the at least one of the first plurality of holes is smaller than the dimension of the corresponding one of the second plurality of holes.

10. The method of claim 1, wherein the step of creating the first plurality of holes in the first sheet and the second plurality of holes in the second sheet comprises:
    inserting a pin through a plurality of sections of the first sheet corresponding to the plurality of openings in the first mandrel; and
    inserting a pin through a plurality of sections of the second sheet corresponding to the plurality of openings in the second mandrel.

11. The method of claim 10, wherein inserting the pin through the plurality of sections of the first sheet and the second sheet pushes fibers of each of the first sheet and the second sheet apart at a location of the pin.

12. The method of claim 10, wherein at least one of the first plurality of holes and at least one of the second plurality of holes has a dimension ranging from 0.010 inches to 0.200 inches, and wherein the dimension is a diameter or a length.

* * * * *